(12) United States Patent
Ozaki

(10) Patent No.: US 7,669,214 B2
(45) Date of Patent: Feb. 23, 2010

(54) DISPLAY APPARATUS FOR DISPLAYING CONTENT DATA, DISPLAY METHOD, AND PROGRAM

(75) Inventor: Eriko Ozaki, Hachioji (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 11/697,018

(22) Filed: Apr. 5, 2007

(65) Prior Publication Data

US 2007/0250877 A1    Oct. 25, 2007

(30) Foreign Application Priority Data

Apr. 7, 2006    (JP)    ............................. 2006-106927

(51) Int. Cl.
  *H04N 7/10* (2006.01)
(52) U.S. Cl. .............................. 725/44; 725/58; 725/142
(58) Field of Classification Search ........................ None
  See application file for complete search history.

(56) References Cited

U.S. PATENT DOCUMENTS

2003/0028595 A1*    2/2003    Vogt et al. .................. 709/204

2005/0047752 A1*    3/2005    Wood et al. ................... 386/83

FOREIGN PATENT DOCUMENTS

| JP | 11-164213   | 6/1999  |
| JP | 2004-072545 | 3/2004  |
| JP | 2004-343520 | 12/2004 |
| JP | 2005-33601  | 2/2005  |

\* cited by examiner

*Primary Examiner*—Andrew Y Koenig
*Assistant Examiner*—Rong Le
(74) *Attorney, Agent, or Firm*—Cowan, Liebowitz & Latman, P.C.

(57) ABSTRACT

A display apparatus has a display unit which displays a list of information on a first program content stored in a storage unit and information on a second program content to be broadcast. In a case in which the first and second program contents are program contents of the same title broadcast in series and the second program content is broadcast after the first program content, when the necessary playback time of at least part of the first program content that has not been played back is longer than the time interval between the current time point and the broadcast start time point of the second program content, the information on the first program content is excluded from the list display.

5 Claims, 10 Drawing Sheets

DISPLAY APPARATUS FOR DISPLAYING CONTENT DATA, DISPLAY METHOD, AND PROGRAM

BACKGROUND OF THE INVENTION

1. Field of the Invention

The present invention relates to a display apparatus which displays content data, a display method, and a program.

2. Description of the Related Art

Recently, digital television broadcasting allows broadcasting of various types of information in addition to images and music. The information includes, for example, an electronic program guide (EPG).

The storage capacity of the broadcast receiver can be increased by attaching a large-capacity hard disk. It is difficult to find desired content when the hard disk contains a large amount of data. To solve this, there is known a system capable of searching for broadcast data of each category by holding broadcast data in association with information such as the EPG.

However, the user does not know which contents data he should begin viewing among a large amount of contents data. Thus, there is proposed a technique of assisting viewing of stored content by determining the viewing priority of stored contents (see, e.g., Japanese Patent Laid-Open No. 2005-33601).

Even if the same contents data is stored for a long time or a plurality of number of times, the user does not always like contents. Regarding this, Japanese Patent Laid-Open No. 11-164213 discloses a technique of presenting program information which meets the user's preferences by using the user's viewing tendency.

Most conventional receivers comprise a function of automatically recoding every broadcast episode of a serial program such as a drama series. Since the receiver can save a large amount of data, the user does not care about the storage capacity and need not view every broadcast episode. However, it becomes hard to make out up to which episode the user has viewed.

To solve this problem, a technique disclosed in Japanese Patent Laid-Open No. 2004-343520 manages the episode number of each contents data in a serial program, and whether the contents data has been recorded and viewed. When the user designates playback of a serial program, recorded broadcasts are played back in order from the earliest episode.

Few users enjoy only the middle part of a narrative program such as a drama or movie.

Considering this, Japanese Patent Laid-Open No. 2004-072545 discloses a technique of presenting program information which satisfies user's preferences in consideration of whether the remaining broadcast time is sufficient for a narrative program.

However, the conventional methods cannot determine whether the user has time to view related data which should be seen before the target data. The conventional methods cannot change the display method depending on an obtained determination result.

SUMMARY OF THE INVENTION

It is an object of the present invention to control the display method of contents data related to arbitrary contents data depending on the situation when displaying the arbitrary contents data.

In one aspect of the present invention, a display apparatus includes a reception unit configured to receive a first broadcast program content, a storage unit configured to store the received first program content, a display unit configured to display a list of information on a second program content to be broadcast and information on the first program content stored in the storage unit, and a control unit configured to, in a case in which the first and second program contents are program contents of the same title broadcast in series and the second program content is broadcast after the first program content, when a necessary playback time of at least part of the first program content that has not been played back is longer than a time interval between a current time point and a broadcast start time point of the second program content, control to exclude the information on the first program content from the list display.

Further features of the present invention will become apparent from the following description of exemplary embodiments with reference to the attached drawings.

DESCRIPTION OF THE EMBODIMENTS

Various exemplary embodiments, features, and aspects of the present invention will be described in detail below with reference to the drawings.

Figure 1:
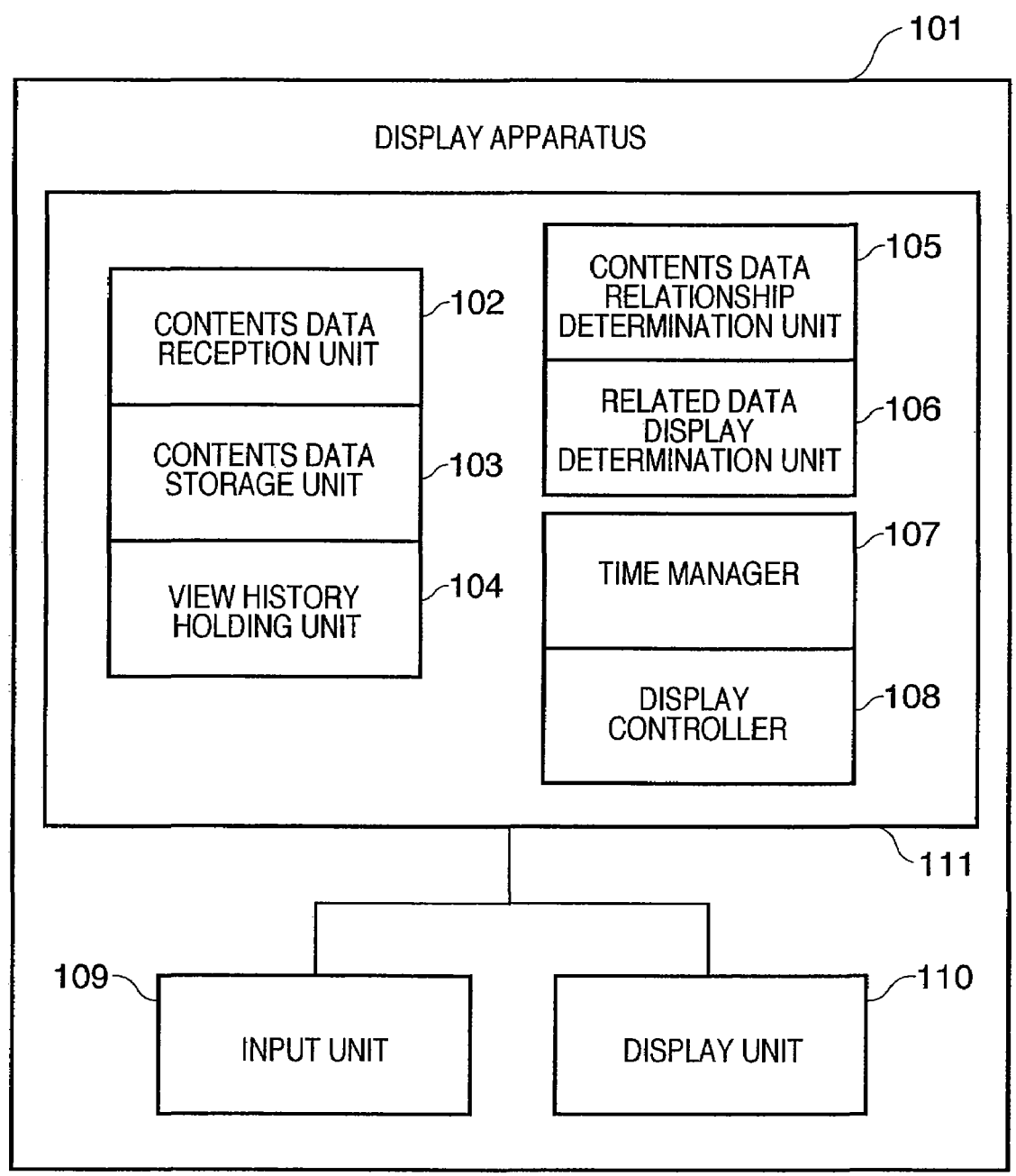
FIG. 1 is a block diagram showing the functional arrangement of a display apparatus according to an embodiment of the present invention.

FIG. 1 is a block diagram showing the functional arrangement of a display apparatus 101 according to an embodiment of the present invention. A contents data reception unit 102 receives broadcast program contents and/or electronic program guide (EPG) data added to the program contents data. A contents data storage unit 103 automatically stores contents data received by the contents data reception unit 102 based on a user's instruction or a preset rule.

A view history holding unit 104 holds information representing whether the user has or has not viewed contents data stored in the contents data storage unit 103. If the user has not viewed contents data or broadcasting is interrupted and stops during viewing, the view history holding unit 104 even holds information on the necessary playback time of unviewed contents data.

A contents data relationship determination unit 105 determines the relationship between program contents to be broadcast and/or contents data stored in the contents data storage unit 103.

A related data display determination unit 106 determines whether to present, to the user, contents data determined to be related by the contents data relationship determination unit 105, and when presenting the related contents data, determines the presentation method and the like.

A time manager 107 manages the current time point and a time point of automatically storing contents. A display controller 108 controls to display data on a display unit 110.

The display unit 110 is implemented by a CRT, liquid crystal display, plasma display, SED display, or the like. The display unit 110 displays a contents image based on contents data output from the display controller 108, and displays icons, various images, characters, and the like.

An input unit 109 comprises a light-receiving unit which accepts an operation with an infrared remote controller. The input unit 109 receives various commands and data in accordance with a user operation.

Instead, the input unit 109 may comprise a keyboard or a pointing device such as a mouse to detect a user input.

An information processing unit 111 stores a control program, implements the functions of the units 102 to 108 in accordance with the program, and also controls the input unit 109 and display unit 110.

Figure 10:
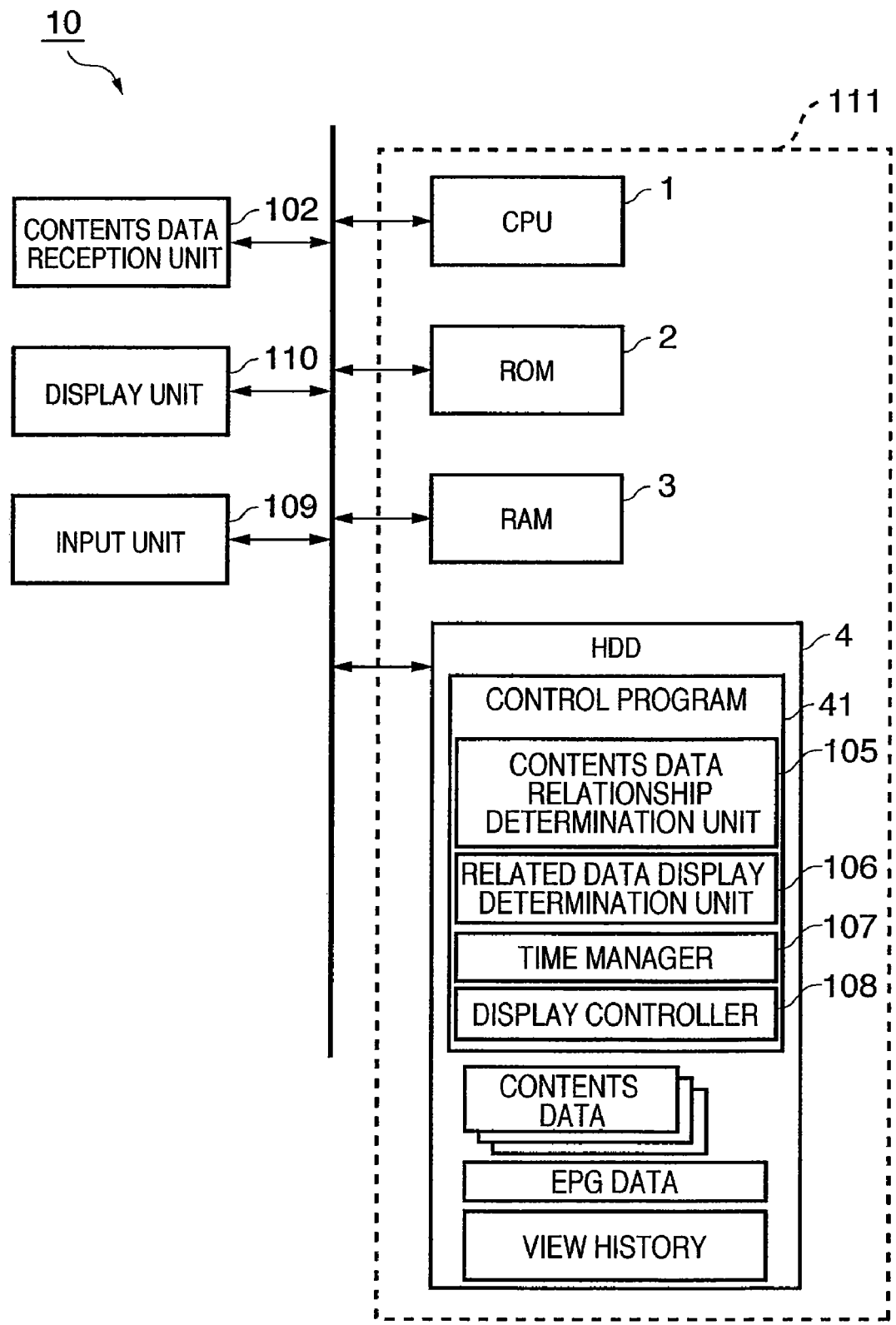
FIG. 10 is a block diagram showing the hardware configuration of the display apparatus according to the embodiment of the present invention.

More specifically, the information processing unit 111 is implementable by a computer system 10 of a hardware configuration as shown in FIG. 10. The computer system 10 comprises a CPU 1 which controls the system, a ROM 2 which stores a boot program and the like, and a RAM 3 which serves as a main memory and provides the work area of the CPU 1. The computer system 10 further comprises a hard disk drive (HDD) 4 as a secondary storage device. The HDD 4 stores a control program 41. The control program 41 contains modules corresponding to the contents data relationship determination unit 105, related data display determination unit 106, time manager 107, and display controller 108. The HDD 4 also functions as the contents data storage unit 103, and stores contents data and EPG data received by the contents data reception unit 102. The HDD 4 also functions as the view history holding unit 104, and stores view history data.

EPG data contains attribute data such as "broadcast station", "broadcast date and time", "title", "genre", and "cast" for each program.

For example, when activating the system, the control program 41 is loaded into the RAM 3, executed by the CPU 1, and implements a process (to be described later) by using the display unit 110 and input unit 109 connected to the system 10.

Figure 2:
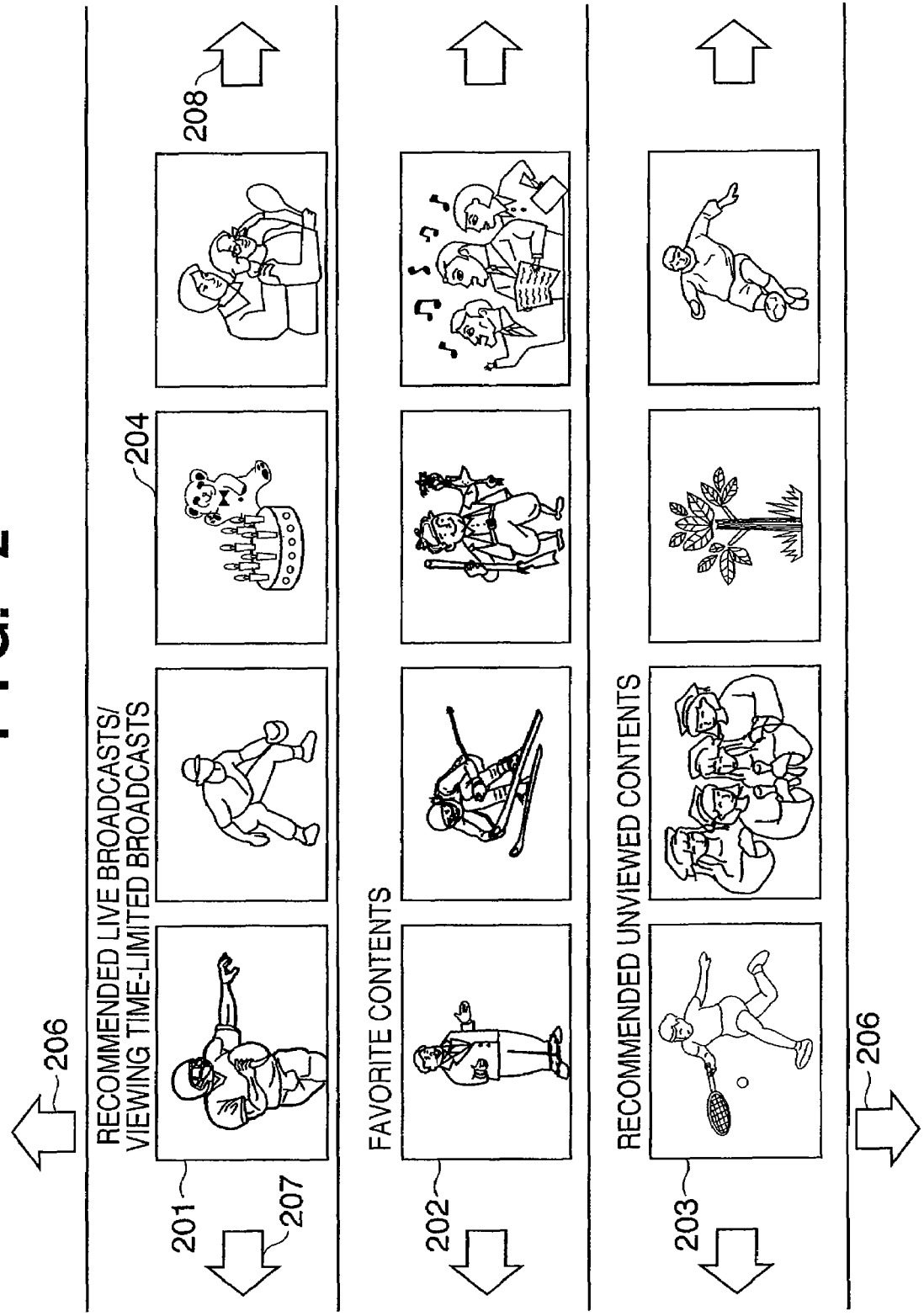
FIG. 2 is a view showing an example of an image displayed on the display unit of the display apparatus according to the embodiment of the present invention.

FIG. 2 shows an example of a GUI (Graphical User Interface) on the contents list display. Contents data are preferably displayed by arranging thumbnail images side by side using reduced contents images so that the user can easily recognize the contents data.

Thumbnail images make it possible to create a list capable of displaying a plurality of choices at once though the list changes depending on the size of the display unit 110.

As the type of contents, it is preferable to seamlessly use a plurality of types of contents such as television-broadcast contents, television-recorded contents, user-created still and moving image contents, music contents. The embodiment does not especially limit the type of contents. In FIG. 2, contents are classified into categories such as "recommended live broadcasts/viewing time-limited broadcasts" 201, "favorite contents" 202, and "recommended unviewed contents" 203, and displayed in order of recommendation to the user.

Categories other than the above ones can also be prepared, and a list of categories which cannot be displayed at once is preferably displayed by scrolling. In this case, the category list shows that there are other categories above and below currently displayed ones, as indicated by arrows 205 and 206. As for contents in each category, the window limitation restricts the number of displayable contents data. Similar to the category list, contents data are made scrollable, and arrows 207 and 208 show that there are other contents data.

Although not shown, it is preferable to display contents so that the user can recognize the name and date & time information of the contents (e.g., the creation date and time or scheduled broadcast date), and can discriminate whether contents are an unviewed broadcast, live broadcast, or broadcast program guide.

The first embodiment of the present invention will be explained.

First Embodiment

Figure 3:
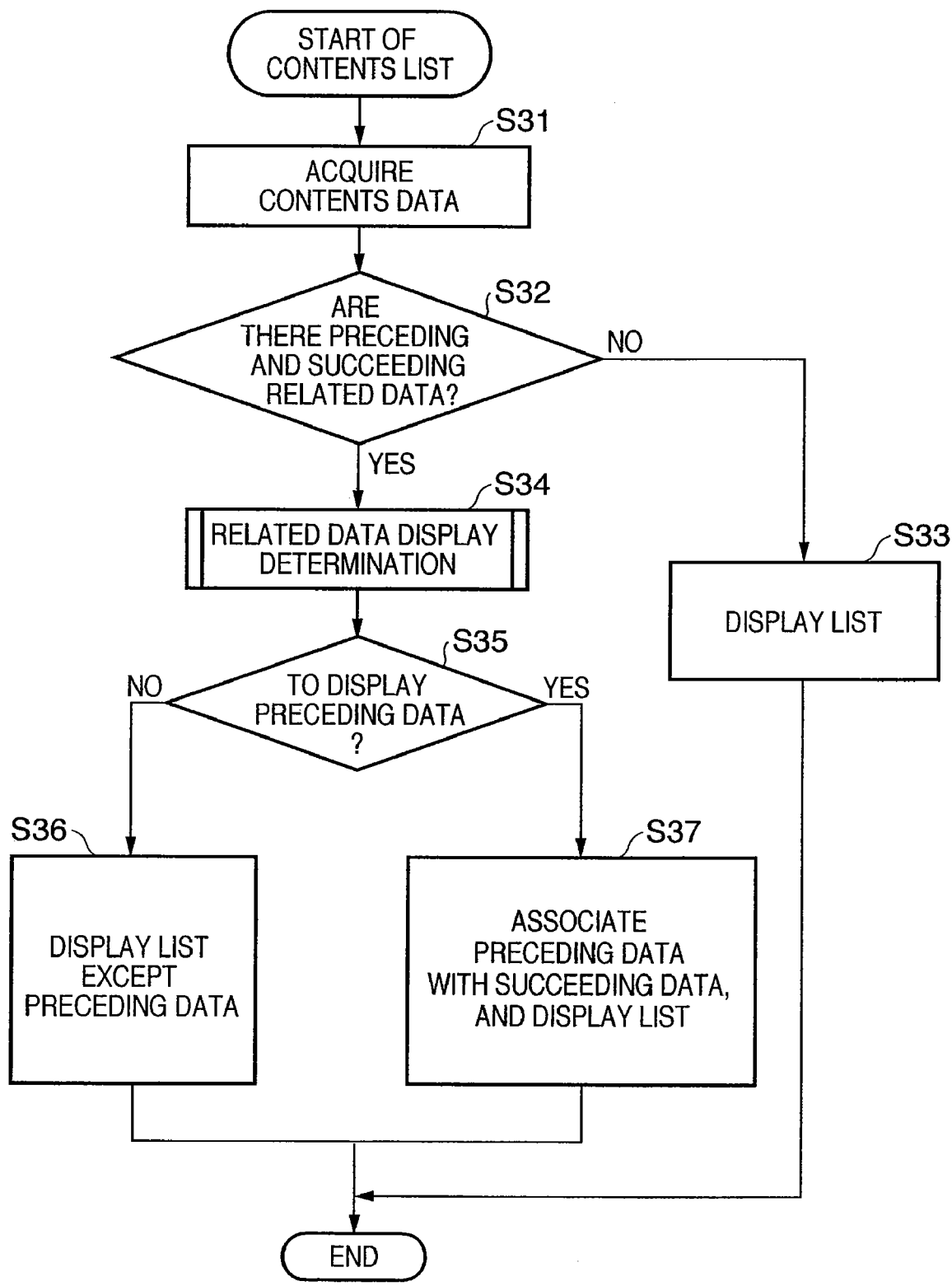
FIG. 3 is a flowchart for explaining an example of an operation when displaying a list of contents data.

FIG. 3 is a flowchart for explaining an example of an operation when an information processing apparatus displays a list of contents data according to the first embodiment. A program corresponding to this flowchart is contained in a control program 41 and executed by a CPU 1. The list is displayed when presenting the result of data search or creating a contents data playback list at the window change timing based on a user input or the like.

In step S31, contents data and EPG data used to display a list are acquired from a contents data storage unit 103. In step S32, a contents data relationship determination unit 105 determines whether there are preceding and succeeding contents data related to the acquired contents data. "Preceding and succeeding related contents data" means program contents of the same title which are broadcast in series as the first and second program contents. The second program contents are broadcast after the first program contents. Such program contents typically belong to a drama series. Of the two program contents data having this relationship, the data of the first program contents will be called "preceding data", and that of the second program contents will be called "succeeding data".

If it is determined that there is neither preceding nor succeeding related data (NO in step S32), a list is displayed in step S33, and the process ends.

If the result is YES in step S32, a related data display determination unit 106 determines in step S34 whether to display the preceding data.

The result of step S34 shows whether it is desirable to display the preceding data. In step S35, the result of step S34 representing whether to display the preceding data is determined. If the result is YES in step S35, the preceding and succeeding data are contained in the list display in association with each other in step S37.

If the result is NO in step S35, the process shifts to step S36 to set and display only the succeeding data in the list display without displaying the preceding data. Then, the process ends.

Figure 4:
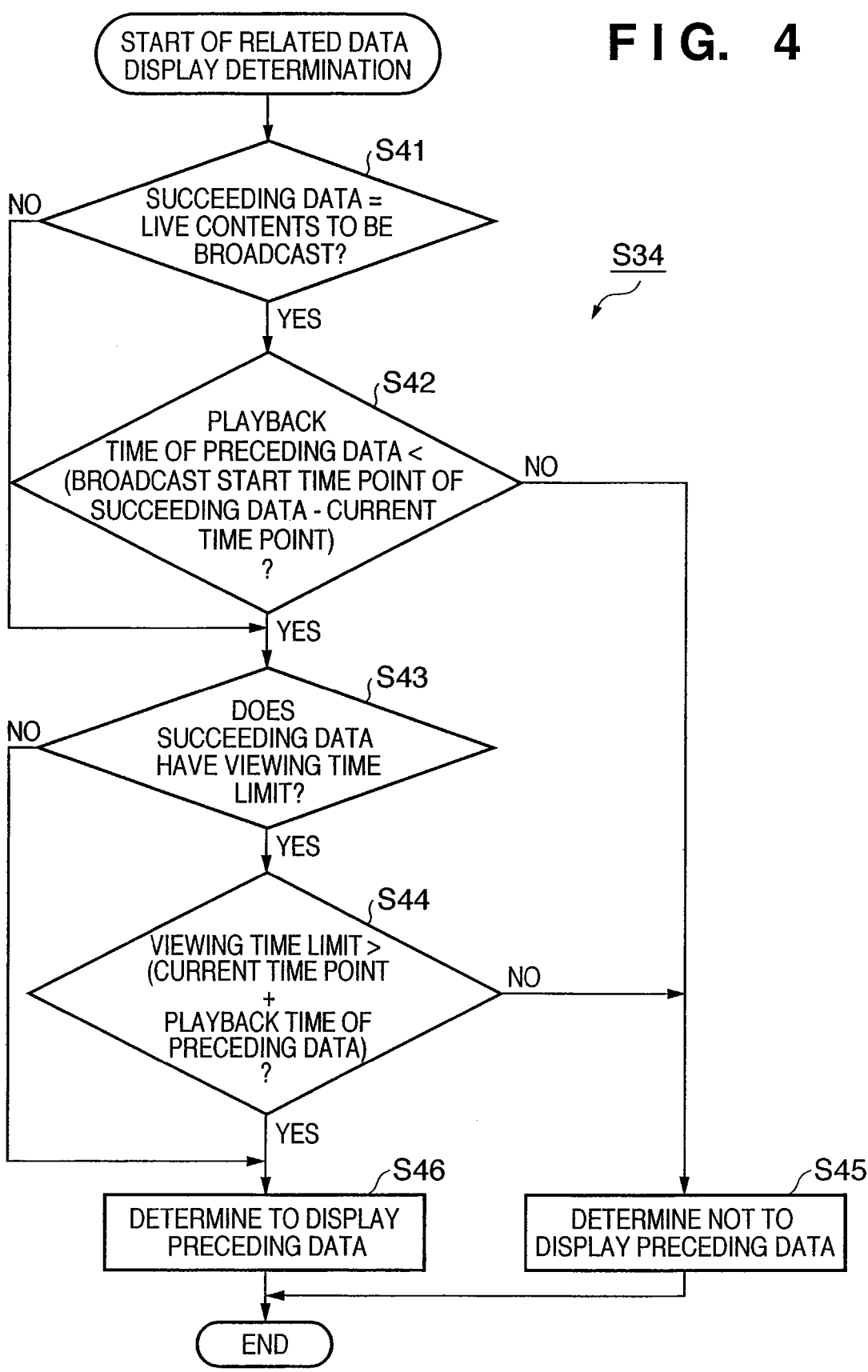
FIG. 4 is a flowchart for explaining an example of the operation of a related data display determination unit.

FIG. 4 is a flowchart for explaining an example of the operation of the related data display determination unit 106 in step S34. At the start of related data display determination for preceding and succeeding related contents data, it is determined in step S41 by referring to EPG data whether the succeeding data is contents data to be broadcast.

If the result is YES in step S41, the process advances to step S42. In step S42, the difference between the scheduled broadcast start time point of the succeeding data and the current time point output from a time manager 107 is calculated. The difference is compared with the time (to be simply referred to as a "necessary playback time" hereinafter) required to play back at least part of the preceding data that has not been played back.

If it is determined that the necessary playback time of the preceding data is longer, there is not enough time to play back the preceding data before the start of broadcasting the succeeding data. In step S45, it is determined not to list the preceding data as a recommendation to the user.

In step S42, even if it is determined that the necessary playback time of the preceding data is longer, it is determined for a live broadcast or the like whether playback can catch up with a real-time broadcast within the remaining broadcast time by using a function such as digest playback or skip playback. When the user selects the use of such a function, preceding data may be displayed as a recommendation to the user.

If the result is NO in step S41 or the result is YES in step S42, it is checked in step S43 whether the succeeding data has a viewing time limit.

If the result is YES in step S43, the sum of the necessary playback time of the preceding data and the current time point output from the time manager 107 is calculated. The sum is compared with the viewable time limit of the succeeding data.

If the viewable time limit of the succeeding data is later, the user has time to view the preceding data until the viewable time limit. In step S46, it is determined to list the preceding data as a recommendation to the user. In the above description, the viewing time limit is set to the time when viewing of succeeding data starts. When the viewing time limit is set to the time when viewing of succeeding data is complete, the sum of the necessary playback time of preceding data, the necessary playback time of succeeding data, and the current time point is compared with the viewable time limit of the succeeding data.

If the result is NO in step S44, the process advances to step S45 to determine not to display the preceding data.

If the result is NO in steps S41 and S43 and the succeeding data is free from any time limit, it is determined in step S46 to display the preceding data.

Although the list display method is not specified, the list may be displayed according to any method of, for example, displaying contents data in priority order such as date order or data type order set in advance by the user, or according to an automatically generated rule.

According to this display determination, even contents data, which should be viewed in advance, is not displayed when it is determined that the user does not have the time to view it. However, display of such contents data is not always omitted. For example, such contents data may be displayed at an end with low priority or in a different color as long as the user can grasp that the degree of recommendation of the contents data is low.

In any case, a display controller 108 creates display data and outputs it to a display unit 110 in accordance with the display method. The display method may be determined by settings or the like by a user operation via an input unit 109.

Figure 6:
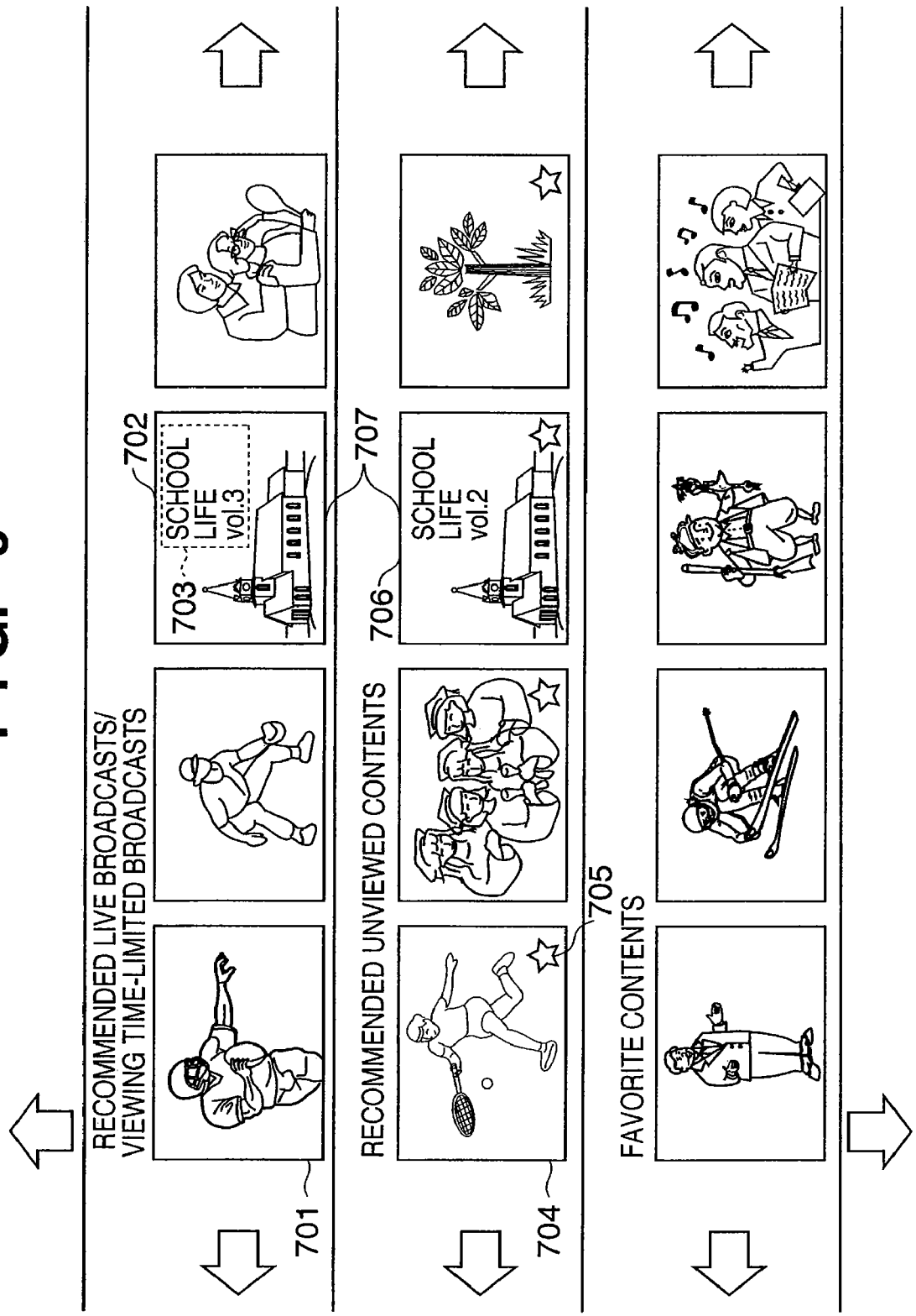
FIGS. 6 and 7 are views showing examples of an image displayed on the display unit of the display apparatus according to the embodiment of the present invention.

If it is determined to display related contents when contents having related contents are to be displayed at a position 204 in the list display window shown in FIG. 2, the list display window changes to one shown in FIG. 6.

A row 701 in FIG. 6 represents the category of scheduled live broadcasts and viewing time-limited contents.

Contents 702 exhibit a program guide. In the contents 702, a frame 703 surrounds a title to represent that the contents 702 are a broadcast program guide.

In an unviewed contents category 704, star graphic data 705 is added to each unviewed contents data to represent that the contents data has not been viewed.

Since the contents 702 contain related unviewed contents, related contents which should be viewed in advance are displayed at a position 706.

At this time, unviewed contents are preferably displayed by linking them with a line 707 so that the user can easily recognize their relationship.

Figure 7:
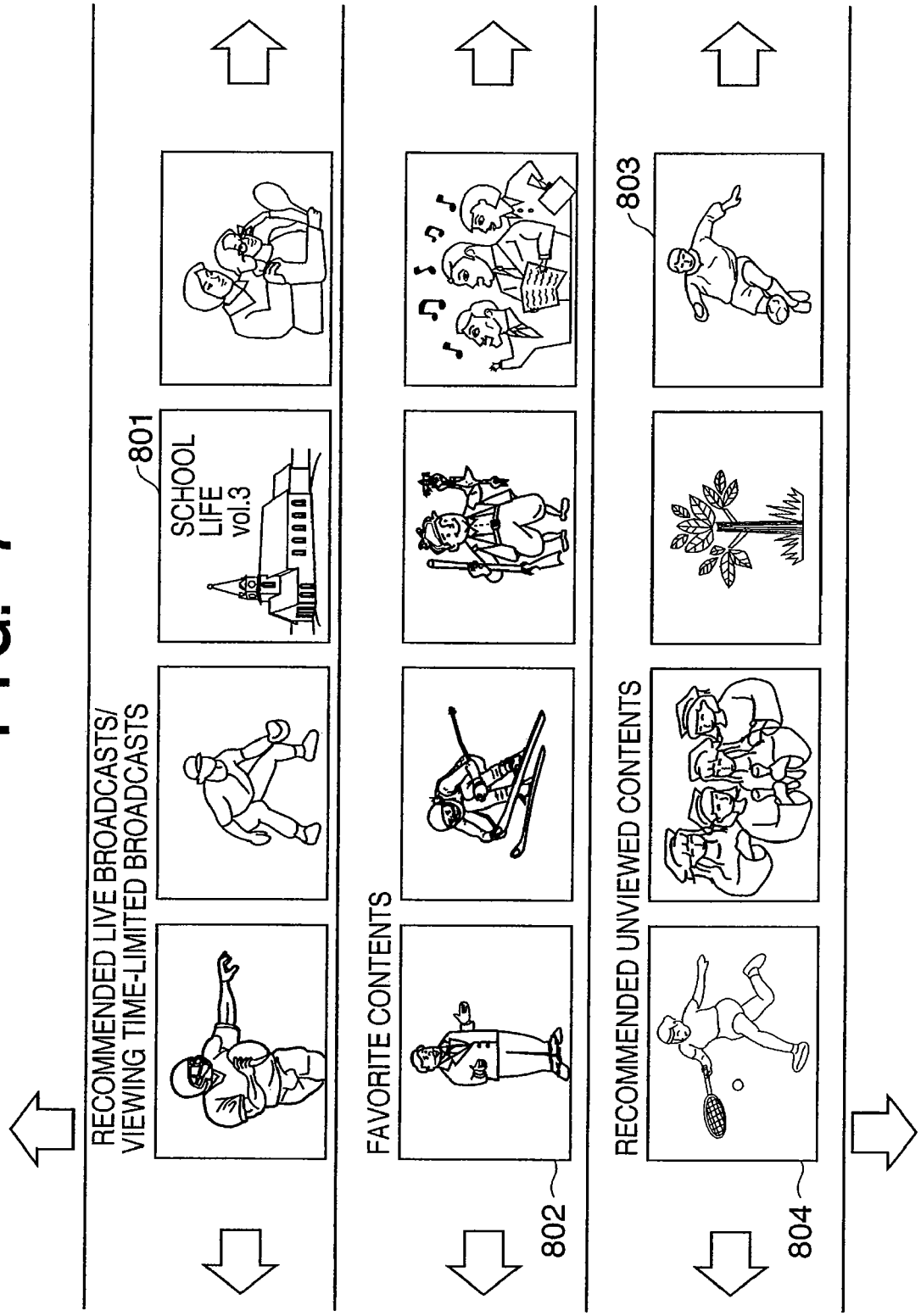

When there are related contents as shown in FIG. 6, categories to which the related contents belong are preferably made close to each other so that the user can pay attention to the related data. FIG. 7 shows an example of the list display when no preceding data is displayed.

Even if preceding data with respect to succeeding data 801 is stored, the preceding data is excluded from the list display because the user does not have the time to view it.

Since the priority of unviewed data does not become higher, for example, a favorite category 802 may move up to attract the user's attention.

At unviewed category 804 need not display related data, and can display unviewed contents 803 which cannot be displayed in FIG. 6. The unviewed category 804 can allow for display of contents more useful to the user.

According to the first embodiment, in case it is determined that the user has time to view preceding data, the unviewed preceding data is displayed as related contents in displaying a contents data list. If it is determined that the user does not have time to view preceding data, no unviewed preceding data is displayed. This improves user friendliness.

Second Embodiment

Figure 9:
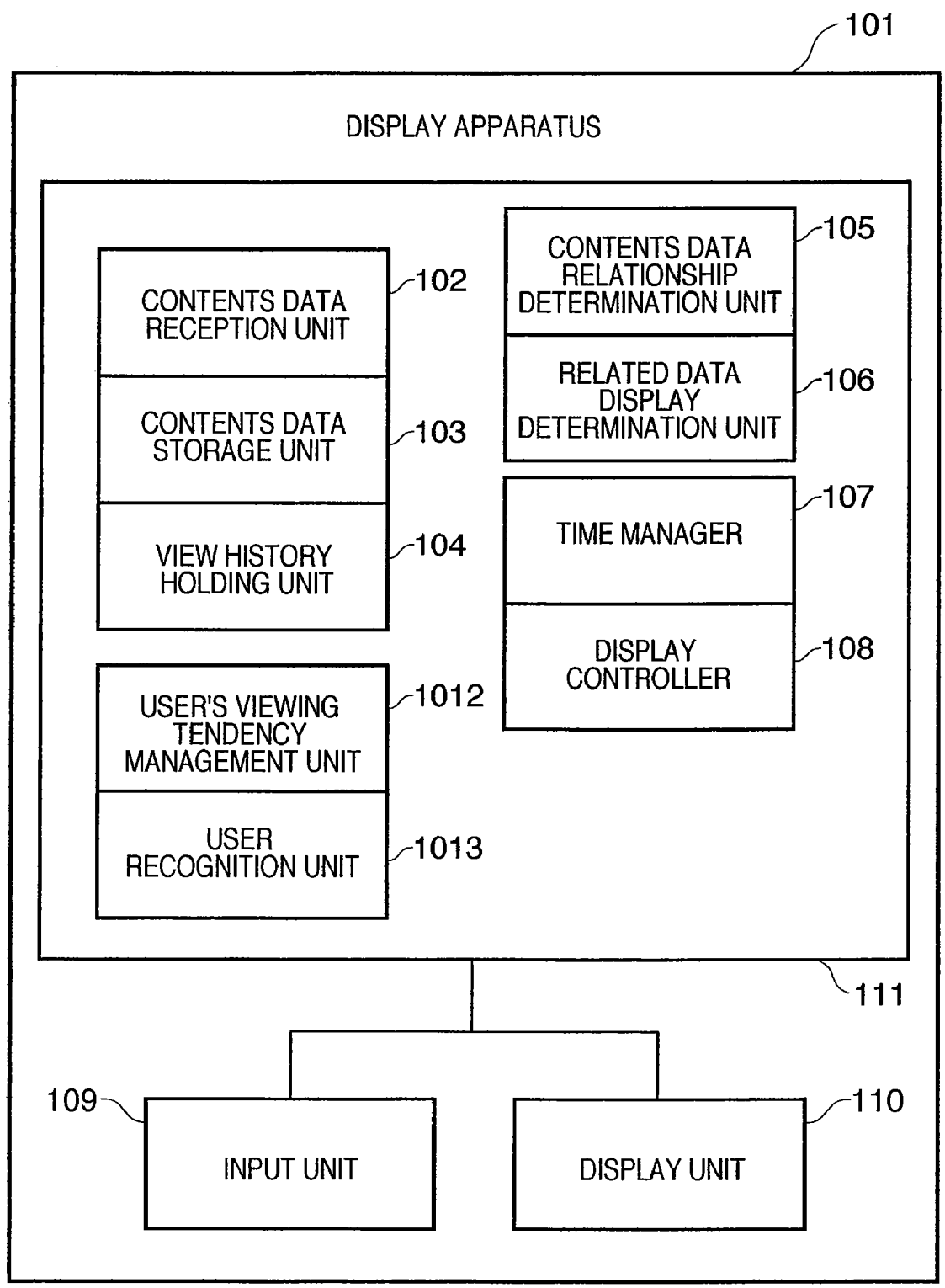
FIG. 9 is a block diagram showing the functional arrangement of a display apparatus according to still another embodiment of the present invention.

The second embodiment of the present invention will be explained with reference to the accompanying drawings. FIG. 9 is a block diagram showing the functional arrangement of a display apparatus 101 according to the second embodiment of the present invention. The display apparatus 101 according to the second embodiment has the same arrangement as that in the above-described first embodiment except for a user's viewing tendency management unit 1012 and user recognition unit 1013. The same reference numerals denote the same blocks, and a description thereof will be omitted.

The user's viewing tendency management unit 1012 manages the average viewing time of a user per day, the maximum continuous viewing time, and the average viewing time on each day of the week by using the view history of the user.

A time manager 107 also manages the calendar. Even if a plurality of users share the display apparatus 101, the user recognition unit 1013 makes it possible to manage the history of each user and provide programs which meet user's preferences.

Figure 5:
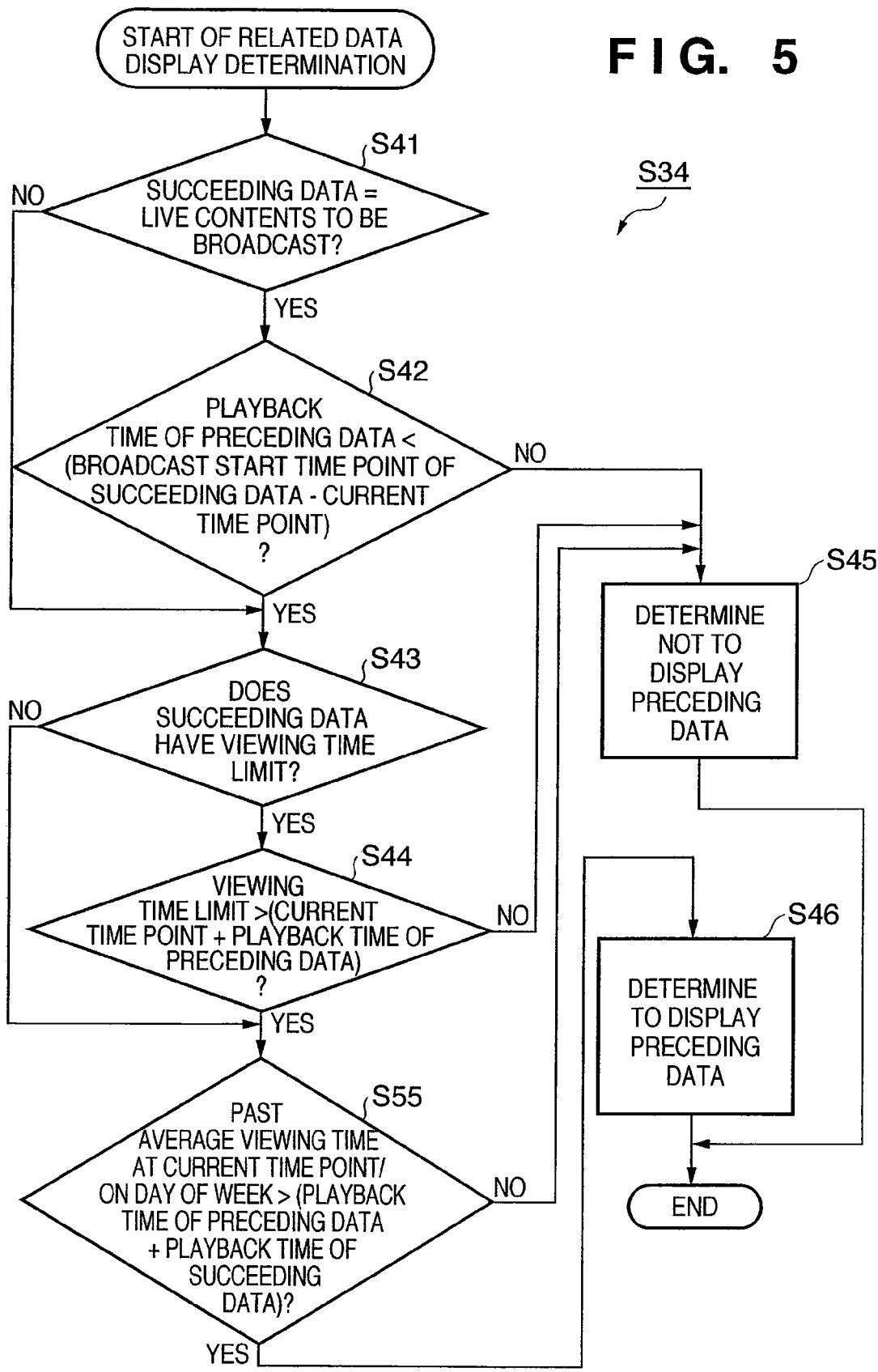
FIG. 5 is a flowchart for explaining another example of the operation of the related data display determination unit.

FIG. 5 is a flowchart for explaining an example of the operation of a related data display determination unit 106 using even the user's viewing tendency. In the flowchart in FIG. 5, decision step S55 is interposed between steps S44 and S46 of the flowchart in FIG. 4 described in the first embodiment. The same reference numerals as those of the flowchart in FIG. 4 denote the same blocks, and a description thereof will be omitted.

As conditions to display preceding data, the display is controlled in step S55 using the user's viewing tendency which is calculated from the view history and managed by the user's viewing tendency management unit 1012, in addition to the first embodiment.

More specifically, in step S55, the average viewing time of the user during the time period when succeeding data is broadcast is calculated from the view history. If the sum of the necessary playback time of preceding data and the necessary playback time of succeeding data is shorter than the average viewing time, it is determined that the user does not have the time to view the preceding data.

If a plurality of users share the display apparatus 101, the viewing tendency of each user is managed by the user recognition unit 1013 and used for display control of each user.

If the user's viewing tendency is known, his view history need not always be used. The user's viewing tendency may be arbitrarily obtained by, for example, inputting it by the user in advance or using user's schedule data stored on a network or another application.

Display control need not always consider the viewing tendency, and may be applied to limit viewing.

As described above, the second embodiment can record the user's viewing tendency, and can display a list of programs the user is highly likely to actually view. The second embodiment can prevent a problem that the user accidently views a program even though he does not have the time to view it.

Third Embodiment

The third embodiment of the present invention will be described. A display apparatus 101 according to the third embodiment has the same arrangement as that in the above-described first embodiment, and a description thereof will be omitted.

Figure 8:
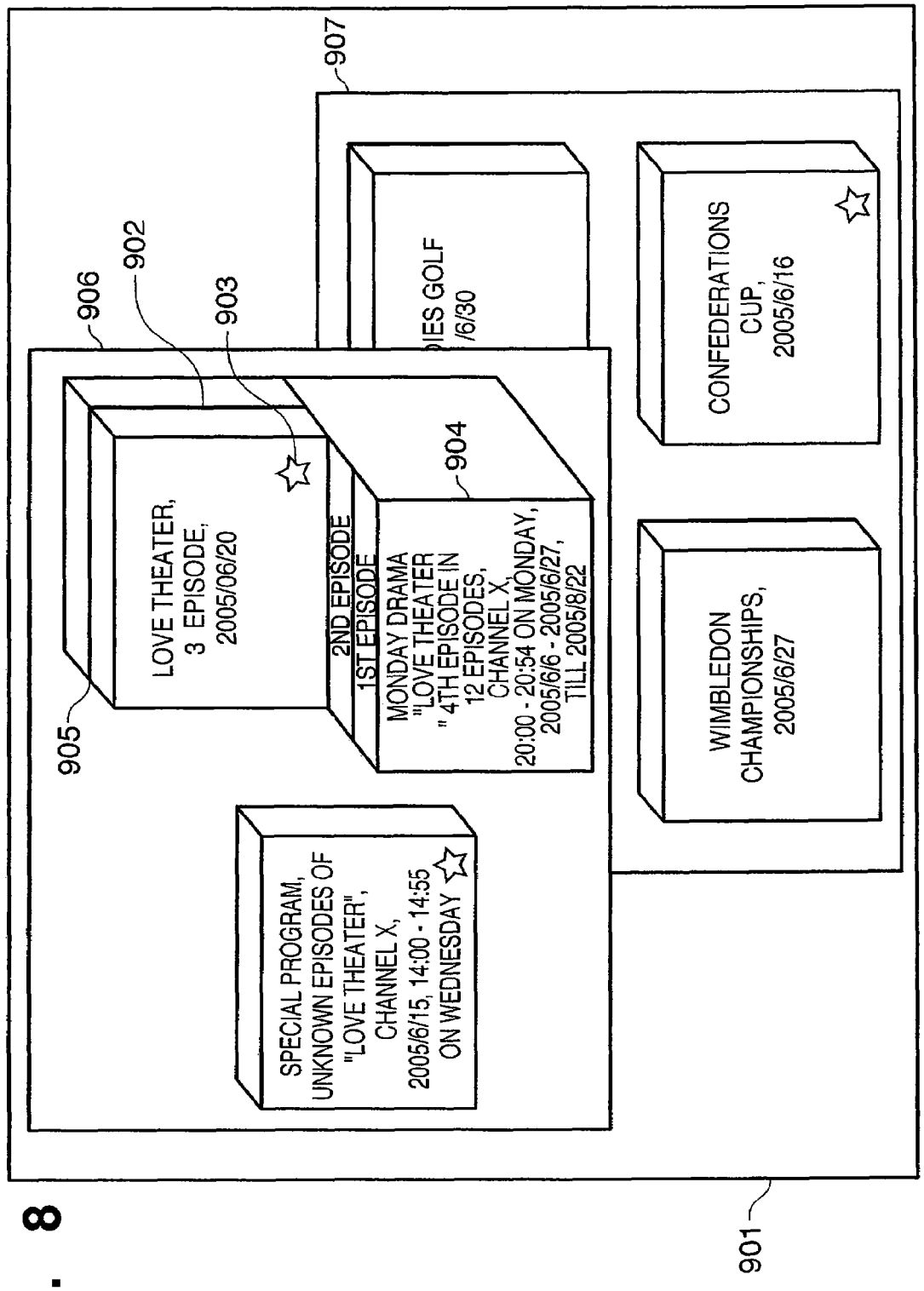
FIG. 8 is a view showing an example of an image displayed on the display unit of a display apparatus according to another embodiment of the present invention.

FIG. 8 is a view showing an example of an image displayed on the display unit by the GUI of a display apparatus according to the third embodiment. Reference numeral 901 denotes an entire display window displayed on a display unit 110. Reference numeral 902 denotes an example of contents having preceding and succeeding related contents. One broadcast episode of a drama series will be exemplified.

Graphic data 903 is added to the contents 902 to represent that the user has not viewed the contents 902. Highly related broadcast contents of the drama series are expressed in a group with a box icon 904.

The box icon 904 contains the contents of broadcast episodes preceding the unviewed contents 902.

The user can select and play back each contents data by an operation via an input unit or the like. Succeeding data 905 can be expressed behind preceding data for easy understanding of their relationship.

The background of the drama series, and a special program of shooting episodes and the like are displayed as highly related contents. However, such contents are not expressed in the box icon 904, but displayed in parallel to clarify the degree of relevance and the type of contents.

A user who is interested in a drama but is reluctant to watch a program associated with the drama can easily notice only the relationship between the drama and its related program. The user does not erroneously select the related program as the broadcast contents of the drama.

Other related programs can also be displayed in an icon 907 on another layer in the display window.

As described above, according to the third embodiment, unviewed contents of highly related broadcast episodes in a serial program are displayed with emphasis while expressing the serial program as a set in one icon. A broadcast which is not a serial broadcast but is related to the serial program can be displayed aside as another icon with emphasis. This improves user friendliness.

All the above-described embodiments adopt a display apparatus having a storage unit and control unit, but the storage unit and control unit need not always be integrated with the display apparatus.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-106927, filed Apr. 7, 2006, which is hereby incorporated by reference herein in its entirety.

What is claimed is:

1. A display apparatus comprising:
   a reception unit configured to receive a first broadcast program content;
   a storage unit configured to store the received first program content;
   a display unit configured to display a list of information on a second program content to be broadcast and information on the first program content stored in said storage unit; and
   controller configured to, determine whether the first and second program contents are program contents of the same title broadcast in series and the second program content is broadcast after the first program content, control, based on the determination to exclude the information on the first program content from the list display if a necessary playback time of at least part of the first program content that has not been played back is longer than a time interval between a current time point and a broadcast start time point of the second program content.

2. The apparatus according to claim 1, wherein said control unit further controls to exclude the information on the first program content from the list display when the second program content has a viewable time limit and at least part of the first program content that has not been played back cannot be completely played back till the viewable time limit.

3. The apparatus according to claim 1, further comprising:
   a holding unit configured to hold a view history of a user; and
   a computing unit configured to calculate, from the view history, an average viewing time of the user during a time period when the second program content is broadcast,
   wherein said control unit further controls to exclude information on the first program content from the list display when a sum of a necessary playback time of at least part of the first program content that has not been played back and a necessary playback time of the second program content is shorter than the average viewing time.

4. A method of displaying information on contents data, comprising the steps of:
   receiving a first broadcast program content;
   storing the received first program content in a storage unit; and
   displaying a list of information on a second program content to be broadcast and information on the first program content stored in the storage unit,
   determining whether the first and second program contents are program contents of the same title broadcast in series and the second program content is broadcast after the first program content, based on said determining step, excluding the information from the first program content from the list display if a necessary playback time of at least part of the first program content that has not been played back is longer than a time interval between a current time point and a broadcast start time point of the second program content.

5. A tangible computer readable non-transitory medium with instructions encoded thereon, which when executed by a processor cause the processor to perform steps comprising:
   receiving a first broadcast program content;
   storing the received first program content in a storage unit; and
   displaying a list of information on a second program content to be broadcast and information on the first program content stored in the storage unit,
   determining whether the first and second program contents are program contents of the same title broadcast in series and the second program content is broadcast after the first program content, based on said determining step, excluding the information from the first program content from the list display if a necessary playback time of at least part of the first program content that has not been played back is longer than a time interval between a current time point and a broadcast start time point of the second program content.

* * * * *